(12) United States Patent
Leonardi et al.

(10) Patent No.: US 9,778,628 B2
(45) Date of Patent: Oct. 3, 2017

(54) OPTIMIZATION OF HUMAN SUPERVISORS AND CYBER-PHYSICAL SYSTEMS

(71) Applicant: Goodrich Corporation, Charlotte, NC (US)

(72) Inventors: Francesco Leonardi, Glastonbury, CT (US); Luca F. Bertuccelli, Manchester, CT (US); Amit Surana, West Hatford, CT (US)

(73) Assignee: Goodrich Corporation, Charlotte, NC (US)

( * ) Notice: Subject to any disclaimer, the term of this patent is extended or adjusted under 35 U.S.C. 154(b) by 596 days.

(21) Appl. No.: 14/454,301

(22) Filed: Aug. 7, 2014

(65) Prior Publication Data

US 2016/0041535 A1  Feb. 11, 2016

(51) Int. Cl.
G05B 13/04  (2006.01)
G05B 23/02  (2006.01)

(52) U.S. Cl.
CPC ......... *G05B 13/04* (2013.01); *G05B 23/0267* (2013.01); *G05B 13/048* (2013.01)

(58) Field of Classification Search
None
See application file for complete search history.

(56) References Cited

U.S. PATENT DOCUMENTS

| | | | |
|---|---|---|---|
| 6,021,403 A | 2/2000 | Horvitz et al. | |
| 6,731,307 B1 | 5/2004 | Strubbe et al. | |
| 7,429,108 B2 | 9/2008 | Rosenberg | |
| 7,454,313 B2 | 11/2008 | Whitlow et al. | |
| 7,698,246 B2 | 4/2010 | Friedlander et al. | |
| 7,761,393 B2 | 7/2010 | Macbeth et al. | |

(Continued)

FOREIGN PATENT DOCUMENTS

| | | |
|---|---|---|
| EP | 2434443 A2 | 3/2012 |
| EP | 2759895 | 7/2014 |
| JP | 05170537 B2 | 7/1993 |

OTHER PUBLICATIONS

Angelica Nieto Lee et al: "Enhancement of industrial monitoring systems by utilizing context awareness" Cognitive Methods in Situation Awareness and Decision Support (COGSIMA), 2013 IEEE International Multi-Disciplinary Conference on, IEEE, Feb. 25, 2013 (Feb. 25, 2013), pp. 277-284, XP032419040, DOI: 10.1109/COGSIMA.2013.6523858, ISBN: 978-1-4673-2437-3, *p. 277-p. 283 *.

(Continued)

*Primary Examiner* — Alan Chen
(74) *Attorney, Agent, or Firm* — Carlson, Gaskey & Olds, P.C.

(57) ABSTRACT

A method and system for optimizing a human supervised cyber-physical system determines a state of the human operator based on data from multiple psycho physiological sensors, determines a state of each of multiple cyber-physical systems in the human supervised cyber-physical system based on data provided by the cyber-physical systems, and fuses the state of the human operator and the state of each of the plurality of cyber-physical systems into a single state of the human supervised cyber-physical system. The single state is then used to generate recommendations for optimizing a user interface and to generate high level control signals for the cyber-physical systems.

13 Claims, 2 Drawing Sheets

(56) References Cited

U.S. PATENT DOCUMENTS

| | | |
|---|---|---|
| 8,154,615 B2 | 4/2012 | Fedorovskaya et al. |
| 8,202,095 B2 | 6/2012 | Shankle et al. |
| 8,239,015 B2 | 8/2012 | Morikawa et al. |
| 8,374,687 B2 | 2/2013 | Mathan et al. |
| 8,384,534 B2 | 2/2013 | James et al. |
| 2003/0167454 A1 | 9/2003 | Iordanov et al. |
| 2007/0173699 A1 | 7/2007 | Mathan et al. |
| 2010/0033333 A1* | 2/2010 | Victor .................. A61B 3/113 340/576 |
| 2010/0185113 A1 | 7/2010 | Peot et al. |
| 2012/0062567 A1 | 3/2012 | Baier et al. |
| 2012/0242648 A1 | 9/2012 | Baier et al. |
| 2013/0124076 A1 | 5/2013 | Bruni et al. |
| 2015/0066284 A1* | 3/2015 | Yopp .................. B60W 30/00 701/29.2 |

OTHER PUBLICATIONS

Extended European Search Report for Application No. 15179562.2 mailed Nov. 4, 2015.

Bertuccelli, L.F., N. Beckers, and M. Cummings. "Developing operator models for UAV search scheduling", Proceedings of AIAA Guidance, Navigation and Control Conference, 2010.

Crandall, J. and M. Cummings. "Attention allocatione efficiency in human-uv teams", AIAA Infotech Aerospace Conference, 2007.

Crandall, J., M. Cummings, M. Della Penna, and P. Dejong. "Computing the effects of operator attention allocation in human control of multiple robots", IEEE Trans. on Systems, Man, and Cybernetics, Part A: System and Humans, vol. 41, No. 3, pp. 385-397, 2011.

Cummings, M., S. Brunt, S. Mercier, and P. Mitchell. "Automation architecture for single operator, multiple UAV command and control", DTIC document, 2007.

Savla, K. and E. Frazzoli. "A dynamical queue approach to intelligent task management for human operators", Proceedings of the IEEE, vol. 100, No. 3, pp. 672-686, 2012.

Srivastava, V., A. Surana, and F. Bullo. "Adaptive attention allocation in human-robot systems", Proceedings of American Control Conference, pp. 2767-2774, 2012.

Srivastava, V., R. Carli C. Langbort, and F. Bullo. "Attention allocation for decision making queues", DTIC document, 2012.

Wickens, C., S. Dixon, J. Goh, and B. Hammer. "Pilot dependence on imperfect diagnostic automation in simulated UAV flights: An attentional visual scanning analysis", DTIC document, 2005.

* cited by examiner

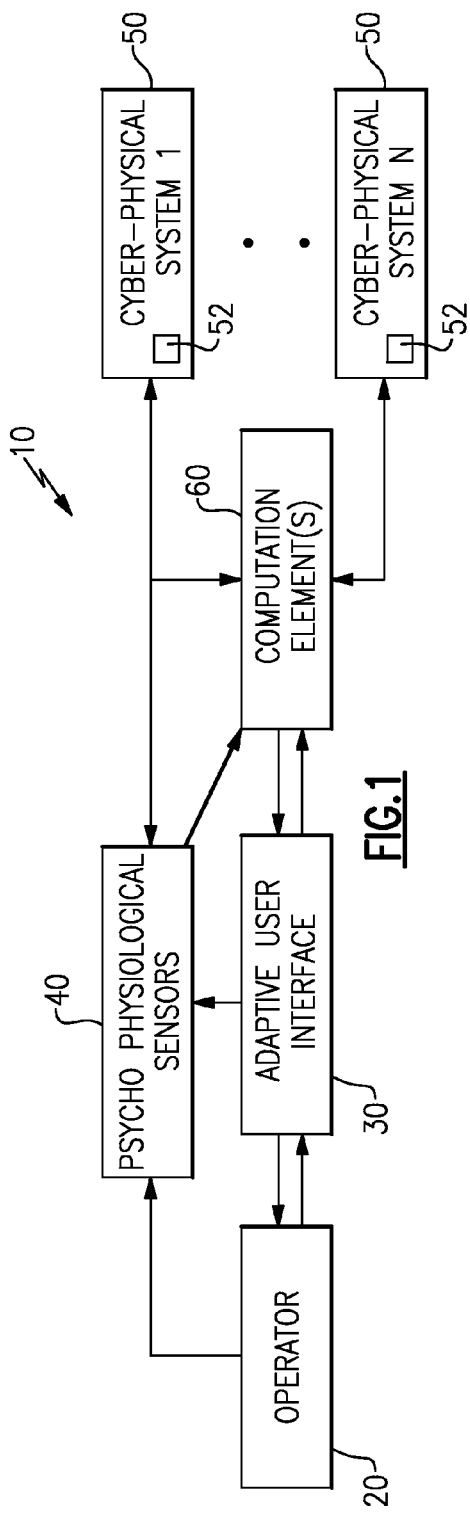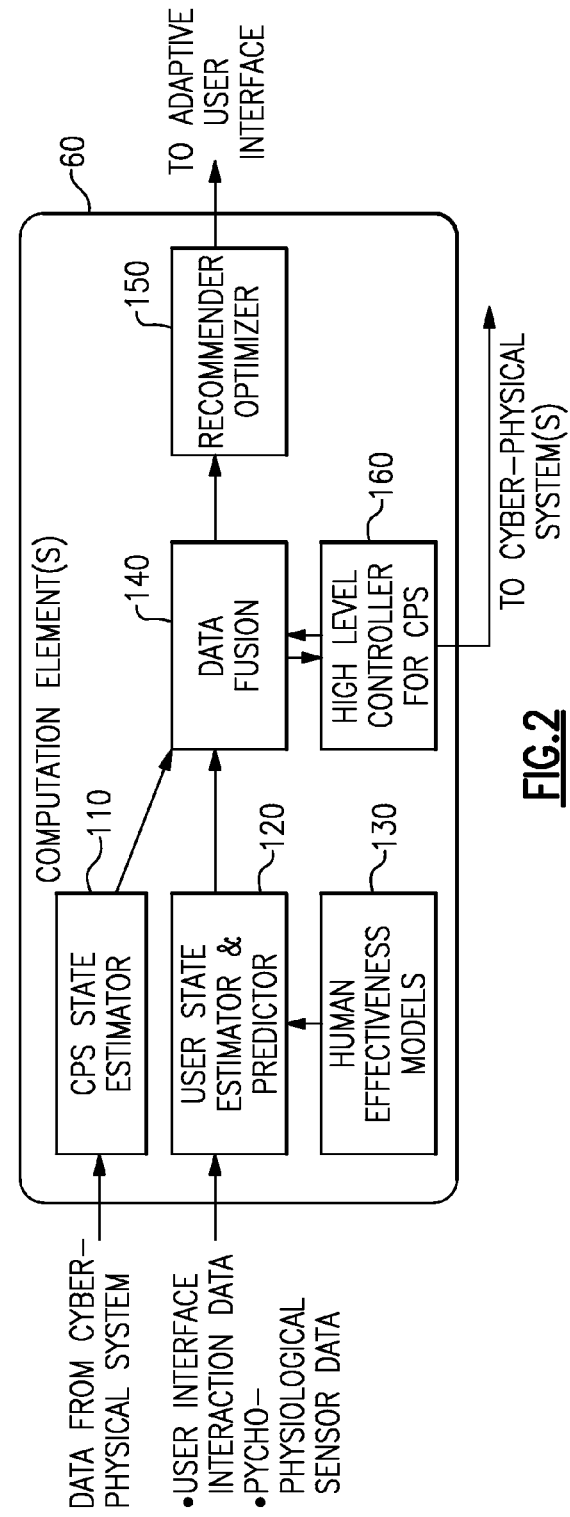

OPTIMIZATION OF HUMAN SUPERVISORS AND CYBER-PHYSICAL SYSTEMS

TECHNICAL FIELD

The present disclosure relates generally to human supervised cyber-physical systems and more specifically to an optimization system for human supervised cyber-physical systems.

BACKGROUND

Cyber-physical systems are a collection of physical elements of a system being controlled (e.g., buildings, aircraft), as well as elements responsible for performing computations (e.g., optimization, estimation, communication). In other words, a cyber-physical system is a system that comprises a plurality of computational elements that collaborate to control one or more physical entities.

Typical examples of cyber-physical systems range from small scale embedded devices on a chip to large-scale systems such as multiple unmanned aerial systems supervised by remote operators. In some examples, human operators act as supervisors in the large-scale systems due to the high levels of responsibility required to ensure safe and effective operation of the cyber-physical systems. By way of example, one large-scale human supervised cyber-physical system is an air traffic control system, with each aircraft being the cyber-physical system and the air traffic controller being the human supervisor. The human supervisor is alternatively referred to as the operator in some human supervised cyber-physical systems.

Current human supervised large scale cyber-physical systems include fundamental technical issues related to the interactions between the human supervisors and the large quantities of data that are presented to the human supervisors. A further issue that can arise is deciding where to allocate the human supervisor's attention activities to focus the human supervisor on the most relevant events in a timely fashion.

In one exemplary cyber-physical system, a human supervisor supervises a building including a large scale sensor network. The cyber-physical system includes the building, building sensors (e.g., smoke detectors, security cameras), and building actuators (e.g., variable air valves, wireless locks). Further, a single human supervisor oversees the day to day operation of the building. With thousands of smoke detectors and hundreds of security cameras, human supervisors will be overwhelmed by the large amounts of data streaming back to the supervision center in real time, absent some form of metering or adapting the data provided to the supervisor.

SUMMARY OF THE INVENTION

Disclosed is a human supervised cyber-physical system comprising: an adaptive user interface, at least one psycho physiological sensor operable to sense at least one characteristic of a human operator and communicate the at least one characteristic to a computerized computational element, a plurality of cyber physical systems, each of the cyber-physical systems in communication with the computerized computational element, wherein each of the plurality of cyber physical systems includes at least one cyber-physical system sensor operable to sense a characteristic of the corresponding cyber-physical system, the computerized computational element comprising at least one processor and a memory, wherein the memory stores a cyber-physical systems state estimator module operable to estimate a state of a cyber-physical system based on an output of the at least one cyber-physical system sensor, a human state estimator module operable to estimate a state of at least one operator based on the at least one characteristic of the operator, a data fusion module operable to merge the state of the operator and the state of each of the cyber-physical systems into a single human supervised cyber-physical system state, a high level cyber-physical systems controller operable to generate high level control commands for each of the cyber-physical systems in response to the single human supervised cyber-physical system state, and a recommender optimizer module operable to cause the adaptive user interface to adapt in response to the single human supervised cyber-physical system state.

Also disclosed is a method for optimizing a human supervised cyber-physical system comprising determining a state of a human operator based on data from a plurality of psycho physiological sensors using a plurality of computational elements, determining a state of each of a plurality of cyber-physical systems in the human supervised cyber-physical system based on data provided by the plurality of cyber-physical systems using the plurality of computational elements, fusing the state of the human operator and the state of each of the plurality of cyber-physical systems thereby generating a single state of the human supervised cyber-physical system using the plurality of computational elements, and adapting a user interface corresponding to the human operator in response to the generated single state of the human supervised cyber-physical system.

These and other features of the present invention can be best understood from the following specification and drawings, the following of which is a brief description.

BRIEF DESCRIPTION OF THE DRAWINGS

FIG. 1 schematically illustrates an example human supervised cyber-physical system FIG. 2 schematically illustrates a computerized computation element for a human supervised cyber-physical system.

DETAILED DESCRIPTION OF AN EMBODIMENT

Figure 3:
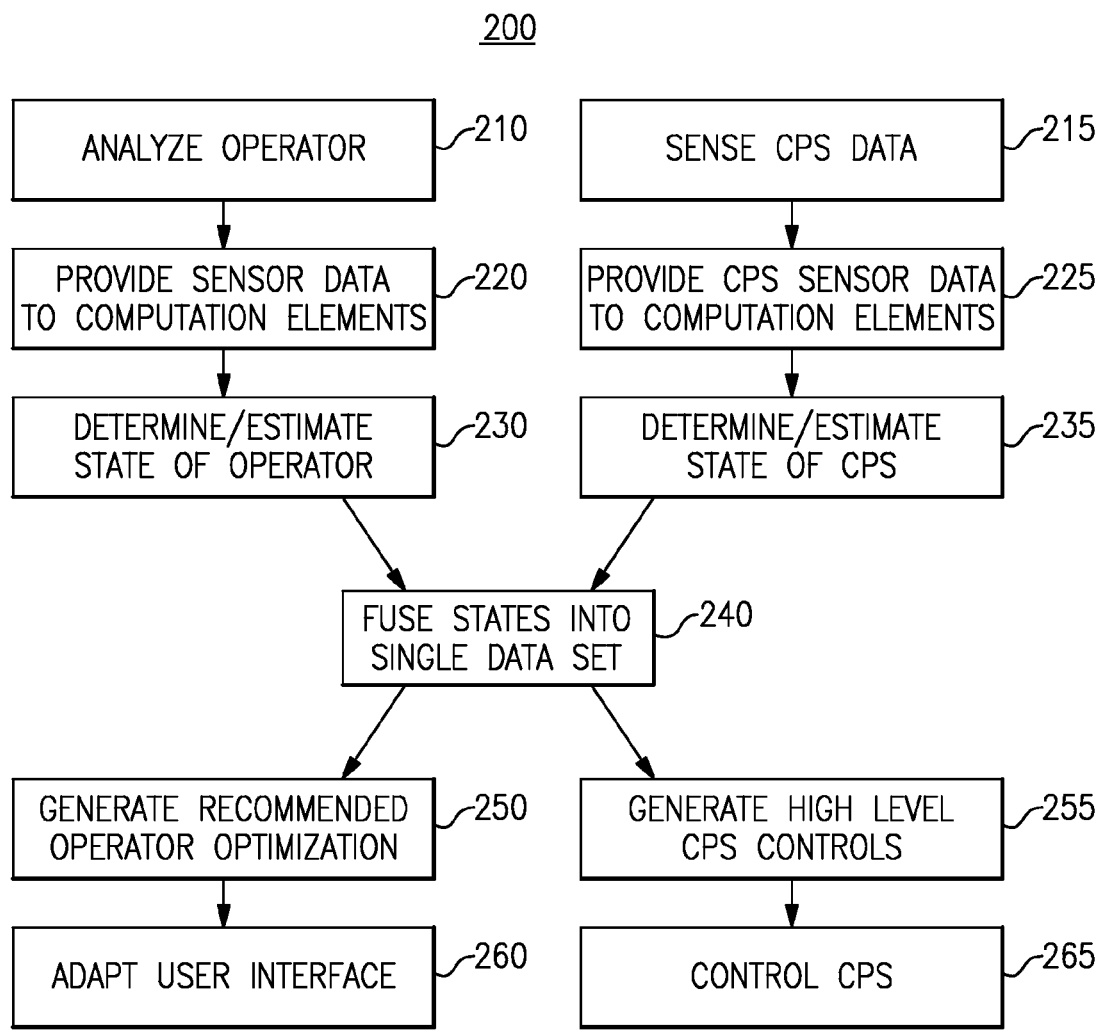
FIG. 3 illustrates a flow process for an example human supervised cyber-physical system.

In existing cyber-physical systems, there is no integrated process for understanding and adapting the aspects related to human supervisory control issues of an operator supervising a large-scale cyber-physical system in order to fully integrate the operator with the cyber-physical system.

Aspects of this integration include: 1) measuring and assessing the attention and workload of the operator; 2) generating optimal recommendations for where the operator's attention should be allocated based on context-sensitive information; 3) ensuring that the operator workload is maintained to within acceptable limits; and 4) ensuring that a fully integrated, model-based system is capable of learning the actions taken by the operator, and feeding back the measurement to generate a suitably tailored set (or sets) of activities for the specific operator.

FIG. 1 schematically illustrates an example human supervised cyber-physical system 10. The human supervised cyber-physical system 10 is an integrated system that enables the cyber-physical systems 10 to assess the operator state (through the combined used of physiological data and human performance models) and the state of the system (through an appropriately designed estimator) to improve overall human-machine performance.

The illustrated human supervised cyber-physical system 10 includes an operator 20 supervising cyber-physical systems 50 through an adaptive user interface 30. The adaptive user interface 30 enables the operator 20 to exchange information with the cyber-physical systems 50. The adaptive user interface 30 can be adapted to correspond to an operator's cognitive awareness of the state of the cyber-physical systems 50. A set of psycho physiological sensors 40 measure the cognitive state of the operator 20. By way of non-limiting example, the psycho physiological sensors 40 can include eye tracking sensors, pupilometry sensors, galvanic skin response sensors, heart rate sensors, facial recognition sensors, EEG readings, electromyography sensing, or any other physiological sensing system. In a further example, the psycho physiological sensors 40 can be any combination of the previously listed sensor types.

Also included in the human supervised cyber-physical system 10 are multiple cyber-physical systems 50. Each of the cyber-physical systems 50 is a system of collaborating elements sensing and controlling physical entities such as aircraft systems, fire alarms, motion sensors and the like. Each of the cyber-physical systems 50 includes one or more data elements 52 that communicate with a computerized computational element 60. The computerized computational element 60 can be a single computer, a network of computers, or any other computerized system for receiving and analyzing the data from the cyber-physical systems 50.

The computerized computational element 60 includes multiple modules, each of which operate in conjunction with the other modules to integrate the human operator 20 and the cyber-physical systems 50 into a single human supervised cyber-physical system 10. The computerized computational element 60 further synthesizes all the data from the psycho physiological sensors 40 and the cyber-physical systems 50 into a single human supervised cyber-physical system 10 state.

During operation of the human supervised cyber-physical system 10, the operator 20 views and interacts with the adaptive user interface 30. The adaptive user interface 30 provides data from the cyber-physical systems 50 to the operator 20 in an intelligible, human understandable format. In some examples, the adaptive user interface 30 includes an input, such as a keyboard or touchscreen that allows the operator 20 to make adjustments and control decisions in response to the data provided by the cyber-physical systems 50.

The psycho physiological sensors 40 analyze the operator 20 and provide the data from such analysis (e.g., the operator's eye position, heart rate, EEG measurement) to the computerized computation element 60. The computerized computation element 60 analyzes the data from the psycho physiological sensors 40 and determines an attentiveness level of the operator 20, or any other factor affecting ability of the operator 20 to process the information being displayed on the user interface. The computerized computation element 60 then alters, or adapts, the adaptive user interface 30 to compensate for the determined ability of the operator 20 to process the information. By way of example, if the computerized computation element 60 determines that the operator 20 is under high stress and unable to intelligibly interpret and/or act upon information exceeding a certain amount, the computerized computation element 60 can prioritize the information to be provided to the operator 20 and provide the information in order of importance. Alternatively, the element 60 can adjust the rate at which information is delivered to the operator 20, or modify the information delivery schedule in some other way.

The processes and elements within the computerized computational element 60 are described as multiple modules, with each module performing a specific function. In a practical implementation, each module can be an independent software block, part of an integrated computer program, or an independent physical memory unit portion of the computerized computational elements 60. With continued reference to FIG. 1, and with like numerals indicating like elements, FIG. 2 schematically illustrates a computerized computation element 60 for a human supervised cyber-physical system ("CPS") 10 including multiple computational modules.

The computational modules include a cyber-physical systems state estimator module 110 that interprets sensor information from a cyber-physical system 50 and assesses a current high level status of a corresponding cyber-physical system 50. A user state estimator and predictor module 120 estimates the operator's workload state based on data from the psycho physiological sensors 40 and the human models, as discussed in more detail below. The user state estimator and predictor module 120 also updates the operator state and predicts a future state of the operator based on the human models.

A human effectiveness models module 130 stores and applies human models that enable the user state estimator and predictor module 120 to determine the state of the operator effectiveness through the analysis of physiological information collected from the psycho physiological sensors 40.

A data fusion module 140 aggregates the information from the user state estimator and predictor module 120 and the cyber-physical systems state estimator module 110 relevant to both the human operator 20 and the cyber-physical systems 50 being controlled. The aggregated data is then synthesized in the data fusion module 140 into a single unified data set that can be used to perform control functions. In some examples, the data fusion can include the elimination of redundant data, the elimination of data unnecessary for a given control task, or any other form of data synthesis.

A recommender/optimizer module 150 utilizes the unified data set from the data fusion module 140 to generate recommendations of current and follow-on tasks to optimize system performance based on a combination of the state of the cyber-physical systems 50 and the state of the operator 20. The recommendations are output to the adaptive user interface 30. The adaptive user interface 30 accepts the recommendations and adapts the interface seen by the operator 20 according to the recommendations.

A high level controller 160 for the cyber-physical systems 50 is also included in the computational elements 60. The high level controller 160 is a control module that generates high level control commands and communicates the high level control commands to the corresponding cyber-physical system 50. The corresponding cyber-physical system 50 then converts the high level control command into specific low level control signals and controls the cyber-physical system 50 according to the high level control command from the high level controller 160.

In alternative examples, additional computational modules can be included in the computational element 60 beyond the computational modules described above. Each of the listed computational modules described generally above is now described in greater detail.

Human effectiveness models are mathematical characterizations of human performance. One example human effectiveness model is the Yerkes-Dodson curve, which relates human level of engagement and performance through the use of physiological data such as pupil dilation and heart rate variability. Other example human effectiveness models include utilizing speed-accuracy tradeoffs in two-choice tasks, where an operator has to optimize making quick, error-prone decisions, to slower, higher-accuracy decisions in a time-constrained environment.

Some human effectiveness models, such as the Yerkes-Dodson curve, are known in the art. The human effectiveness models module 130 can include and apply any of the standard (known) models by treating the structure (the mathematical equations describing the models) and the parameters (the actual variables in the models) as completely known.

Alternatively, the human effectiveness models module 130 can use physiological measurements obtained in real time from the psycho physiological sensors 40 (e.g., eye tracking data, heart rate variability, brain activity) to learn the parameters for the models, while keeping the structure of the model fixed. In such an example, the details of the human effectiveness model are tailored to a specific operator, with the overall model being a standard model.

In another alternative, both the structure of the models as well as the associated parameters are learned by the human effectiveness models module 130 in real-time. Alternatively, the structure and parameters can be learned for a specific operator in a lab environment, and imported to the human effectiveness models module 130. In these examples, both the structure of the model and the specific parameters are tailored to an individual or group of individuals.

By using the above alternative human effectiveness model generation methods the system can apply a generic "human" model, a specific type of human (e.g. airtraffic controller) model, or a specific human model (e.g. a specific operator 20), depending on the needs and demands of the particular human supervised cyber-physical system 10. The user models stored in the human effectiveness models module 130 provide the user state estimator and predictor module 120 a high level insight into the mental state of the operator 20.

The state estimators in the user state estimator and predictor module 120 incorporate human effectiveness models (such as workload and situation awareness) from the human effectiveness models module 130 to determine a current state of the operator 20. The current state of the operator refers to a set of defining characteristics of the operator 20. By way of example, one state can be "low workload" indicating that the psycho physiological sensor 40 readings correspond to a low workload. Alternative states can be "distracted", "high work load", "inattentive" etc. Once the state of the operator 20 is determined, the user state estimator and predictor module 120 uses stored state charts to predict a future state of the operator 20 based on their current state and their past states. Both the currently determined state and the predicted future state are provided to the data fusion module 140. State chart modeling to predict future states of a system based on a current state are generally known in the art.

As with the human state estimator and predictor module 120, the cyber-physical system estimator module 110 determines one or more current states of each cyber-physical system 50, and utilizes state charts stored in the cyber-physical system state estimator module 120 to estimate a future state of the cyber-physical system 50.

While the specific state definitions of a given cyber-physical system 50 vary depending on the particular application of the cyber-physical system 50, cyber-physical systems states for an exemplary unmanned aerial system can include unmanned aerial system position and attitude, unmanned aerial system velocity and attitude rates, environmental conditions (such as wind, adversarial intent), unmanned aerial system mode (e.g., on approach to landing or during a cruise portion), and unmanned aerial system health (fuel levels, damage conditions). Alternatively, one of skill in the art having the benefit of this disclosure will be able to generate specific states and state charts required for a specific type of cyber-physical system 50.

While some of the quantities defining the states of a cyber-physical system 50 can be directly observed, due to current sensing limitations, the information defining some states can be noisy due to sensor limitations. This is particularly true in large scale systems where multiple sensor feeds are providing simultaneous information regarding a single state. Furthermore, other state defining quantities cannot be directly observed. In cases where the state cannot be directly sensed or observed, the cyber-physical systems state estimator module 110 infers state defining quantities based on other state defining quantities that can be observed.

This state estimation can be performed using Kalman filtering, Bayesian networks, intent filters, and other high level data fusion estimators. The result of the state estimation is the distillation of the specific sensor readings of a given cyber-physical system 50 into a high level estimation of the state of the cyber-physical system 50.

Once the states of both the cyber-physical system 50 and the human operator 20 are determined or estimated by the corresponding modules, the states are provided to the data fusion module 140 and the recommender optimizer module 150.

The data fusion module 140 and recommender optimizer module 150 incorporate the operator state and the states associated with each of the cyber-physical systems 50, and merge them together into a single integrated state representative of the overall state of the human supervised cyber-physical system 10. The overall state includes details with regards to the state of the human operator 20 and details with regards to the state of each of the cyber-physical systems 50.

The overall state is then provided to both the recommender optimizer 150 and the high level controller 160 for the cyber-physical system 160. At the recommender optimizer 150 and at the high level controller 160, the integrated state is analyzed and interpreted in order to provide recommended adaptions to the adaptive user interface 150 from the recommender optimizer 150, and to provide high level cyber-physical system controls from the high level controller 160.

In one example of the general operations of the computational elements 60, an operator center initially receives a low volume of data, and the operator 20 is capable of self allocating their attention in a first-in, first-out setting. When multiple sources of data through geographically distributed, multiple time-scale, and heterogeneous sensing begin coming at a higher rate, the data fusion module 140 merges eye tracking and heart rate data from the psycho physiological sensors 40 to generate an overall operator 20 state of workload (e.g., high, medium, or low). The data fusion module 140 integrates this state with, for example, large volumes of data streaming live into the operator center from the cyber-physical systems 50, and, realizing that there is high volume data coming into the operator center with an operator 20 in a high-workload state, the recommender optimizer 150 proactively begins to recommend allocating operator attention to only the highest priority items, rather than in a first-in, first-out setting.

In some examples, this recommendation takes the form of a visual or textual recommendation that the operator 20 may follow or ignore at will. In alternative examples, the recommendation is adopted by the adaptive user interface 30 altering the data or display being presented to the operator 20.

Similarly, the high level controller 160 receives the state information form the data fusion module 140 and provides the high level controls to the cyber-physical systems 50. In some examples, the high level controller 160 can provide instructions for low importance decisions that are otherwise made by the operator 20, thereby adapting and reducing a workload of the operator 20.

While described above, and illustrated in FIGS. 1 and 2 as a single operator 20 supervising multiple cyber-physical systems 50, one of skill in the art could adapt the above to include multiple operators supervising multiple cyber-physical systems and still fall within this disclosure.

FIG. 3 illustrates an overall flow process 200 for an example human supervised cyber-physical system including the elements described generally above. Initially the flow process includes multiple simultaneous data flows with the psycho physiological sensors 40 analyzing the operator in an "analyze operator" step 210, and the sensors on each cyber-physical system analyzing the cyber-physical system in a "sense CPS data" step 215. Once the sensor information has been generated in the corresponding steps 210, 215 the sensor data is provided to the computerized computational elements 60 in a "provide sensor data to computation elements" step 220 and a "provide CPS sensor data to computation elements" step 225.

When the data is received, the user state estimator and predictor module 120 and the human effectiveness models module 130 utilize the operator data to determine a current state of the operator 20 in a "determine/estimate state of operator" step 230. At or about the same time as the "determine/estimate state of operator" step 230, the CPS state estimator module 110 utilizes the CPS data to determine/estimate the state of the cyber-physical system 50. In systems incorporating multiple cyber-physical systems 50, the cyber-physical systems branch (steps 215, 225, 235) are performed for each cyber-physical system 50. Similarly, if there is more than one human operator 20, the operator branch (steps 210, 215, 225) are performed for each operator 20. In alternate example systems, the determining or estimating the state of the operator 20 (Step 230) and the steps in the cyber-physical systems branch (steps 215, 225, 235) are not performed simultaneously or approximately simultaneously.

Once a determined or estimated state for each operator 20 and each cyber-physical system has been established by the corresponding computational element module, the states are fused into a single state of the human supervised cyber-physical system in a "fuse states into single data set" step 240. The single data set is a single "state" that is representative of the current state of all each cyber-physical system 50 and each operator 20.

Once the single state has been generated or determined, the state is provided to the recommender optimizer module 150 and to the high level controller 160. From here, the process 200 branches again with a branch corresponding to each operator 20 and a branch corresponding to each cyber-physical system 50.

The single state is provided to the recommender optimizer module 150. The recommender optimizer module 150 analyzes the single state and determines recommendations for optimizing the user interface of a given user based on the single state in a "generate recommended operator optimization" step 250. The recommendations are then sent to the adaptive user interface 30 of the corresponding operator 20. The adaptive user interface than adapts the interface seen by the operator 20 by either displaying the recommended optimization for the operator 20 to view, or by altering the amount of data displayed to the operator to enforce the recommended optimization in an "adapt user interface" step 260.

Simultaneously with the above, the single state is sent to the high level controller 160 for the cyber-physical systems. The high level controller then generates high level control instructions that can be provided to the individual cyber-physical systems 50 based on the single state and the next predicted state of the human supervised cyber-physical system 10 in a "generate high level CPS controls" step 255. Each of the cyber-physical systems then converts any high level control instructions it received into specific control signals relevant to the specific cyber-physical system 50 in a "control CPS" step 265.

While listed above as a discrete process, one of skill in the art having the benefit of this disclosure will understand that the above process is continuously iterated, thereby allowing for continual control and adaption of the human supervised cyber-physical system 10.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A human supervised cyber-physical system comprising:
an adaptive user interface;
at least one psycho physiological sensor operable to sense at least one characteristic of human operator and communicate the at least one characteristic to a computerized computational element;
a plurality of cyber physical systems, each of said cyber-physical systems in communication with the computerized computational element, wherein each of said plurality of cyber physical systems includes at least one cyber-physical system sensor operable to sense a characteristic of the corresponding cyber-physical system;
the computerized computational element comprising at least one processor and a memory, wherein the memory stores:
a cyber-physical systems state estimator module operable to estimate a state of a cyber-physical system based on an output of the at least one cyber-physical system sensor,
a human state estimator module operable to estimate a state of at least one human operator based on said at least one characteristic of the human operator,
a data fusion module operable to merge the state of the human operator and the state of each of said cyber-physical systems into a single human supervised cyber-physical system state, a high level cyber-physical systems controller operable to generate high level control commands for each of said cyber-physical systems in response to said single human supervised cyber-physical system state; and a recommender optimizer module operable to cause said adaptive user interface to adapt in response to said single human supervised cyber-physical system state by at least displaying an optimization recommendation to the human operator and allowing the human operator to manually enact the optimization recommendation.

2. The human supervised cyber-physical system of claim 1, wherein the computerized computational element further comprises a human effectiveness models module, and wherein the human effectiveness models module is operable to apply said psycho physiological sensor data to at least one human effectiveness model to determine a current state of the operator.

3. The human supervised cyber-physical system of claim 2, wherein the at least one human effectiveness model is one of a generic human model, a specific type of human model, and a specific human model.

4. The human supervised cyber-physical system of claim 3, wherein the at least one human effectiveness model includes a structure and a plurality of parameters, and wherein the structure comprises a plurality of mathematical equations describing the human effectiveness model and the parameters comprise a plurality of variables within the structure.

5. The human supervised system of claim 1, wherein the adaptive user interface comprises at least an operator screen and a user interface, and wherein the adaptive user interface is operable to alter a display visible to an operator in response to recommendations from the recommender optimizer.

6. The human supervised system of claim 1, wherein each of the plurality of cyber-physical systems includes a controller operable to convert high level control instructions received from the high level controller to specific control instructions for the cyber-physical system.

7. The human supervised system of claim 1, wherein each of said cyber-physical systems is remote from said operator.

8. A method for optimizing a human supervised cyber-physical system comprising:
determining a state of a human operator based on data from a plurality of psycho physiological sensors using a plurality of computational elements;
determining a state of each of a plurality of cyber-physical systems in the human supervised cyber-physical system based on data provided by the plurality of cyber-physical systems using the plurality of computational elements;
fusing the state of the human operator and the state of each of the plurality of cyber-physical systems thereby generating a single state of the human supervised cyber-physical system using the plurality of computational elements; and
adapting a user interface corresponding to the human operator in response to the generated single state of the human supervised cyber-physical system by at least displaying an optimization recommendation to the human operator and allowing the human operator to manually decline to enact the optimization recommendation.

9. The method of claim 8, wherein adapting a user interface corresponding to the human operator in response to the generated single state of the human supervised cyber-physical system comprises altering a display of the adaptive user interface such that a recommendation from an optimizer module is automatically followed by said human operator.

10. The method of claim 9, further comprising providing high level control instructions to at least one of said cyber-physical systems, thereby reducing a number of decisions required from the human operator.

11. The method of claim 8, wherein determining a state of a human operator based on data from a plurality of psycho physiological sensors comprises applying at least one human effectiveness model to the data from the plurality of psycho physiological sensors, thereby determining a current state of the operator.

12. The method of claim 8, wherein the human effectiveness model includes a structure and a plurality of parameters, and wherein the structure comprises a plurality of mathematical equations describing the human effectiveness model and the parameters comprise a plurality of variables within the structure.

13. The method of claim 8, wherein the computation elements include
a cyber-physical systems state estimator module operable to estimate a state of the cyber-physical system based on an output of at least one cyber-physical system sensor,
a human state estimator module operable to estimate a state of the human operator based on data from the plurality of psycho physiological sensors,
a data fusion module operable to merge the state of the operator and the state of each of said cyber-physical systems into a single human supervised cyber-physical system state,
a high level cyber-physical systems controller operable to generate high level control commands for each of said cyber-physical systems in response to said single human supervised cyber-physical system state; and
a recommender optimizer module operable to cause said adaptive user interface to adapt in response to said single human supervised cyber-physical system state.

* * * * *

UNITED STATES PATENT AND TRADEMARK OFFICE
CERTIFICATE OF CORRECTION

PATENT NO. : 9,778,628 B2  
APPLICATION NO. : 14/454301  
DATED : October 3, 2017  
INVENTOR(S) : Leonardi et al.

It is certified that error appears in the above-identified patent and that said Letters Patent is hereby corrected as shown below:

In the Claims

In Claim 1, Column 8, Line 45; replace "of human operator" with --of a human operator--

In Claim 2, Column 9, Line 17; before "psycho physiological" delete "said"

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*